US009244499B2

(12) United States Patent
Tu

(10) Patent No.: US 9,244,499 B2
(45) Date of Patent: Jan. 26, 2016

(54) MULTI-STAGE DEVICE ORIENTATION DETECTION

(75) Inventor: Xiaoyuan Tu, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 661 days.

(21) Appl. No.: 13/492,691

(22) Filed: Jun. 8, 2012

(65) Prior Publication Data
US 2013/0328935 A1 Dec. 12, 2013

(51) Int. Cl.
G06F 1/16 (2006.01)

(52) U.S. Cl.
CPC ...... *G06F 1/1694* (2013.01); *G06F 2200/1614* (2013.01)

(58) Field of Classification Search
CPC ....... G01P 15/18; G06F 17/50; G06F 3/0346; G09G 2340/0492
USPC .................... 345/659, 158, 207, 651; 33/356; 702/141
See application file for complete search history.

(56) References Cited

U.S. PATENT DOCUMENTS

| 2006/0010699 | A1* | 1/2006 | Tamura ....................... 33/355 R |
| 2006/0032064 | A1* | 2/2006 | Sato et al. ....................... 33/356 |
| 2009/0085867 | A1 | 4/2009 | Bang et al. |
| 2009/0265671 | A1 | 10/2009 | Sachs et al. |
| 2010/0033422 | A1 | 2/2010 | Mucignat et al. |
| 2010/0214320 | A1 | 8/2010 | Mo |
| 2011/0172918 | A1 | 7/2011 | Tome |
| 2012/0056801 | A1 | 3/2012 | Bevilacqua et al. |
| 2013/0057571 | A1 | 3/2013 | Harris |
| 2013/0176291 | A1* | 7/2013 | Leonard ......................... 345/207 |
| 2013/0184031 | A1 | 7/2013 | Pollington et al. |
| 2013/0245986 | A1* | 9/2013 | Grokop et al. ................ 702/141 |
| 2014/0085341 | A1* | 3/2014 | Shin et al. ...................... 345/659 |
| 2014/0152564 | A1* | 6/2014 | Gulezian et al. .............. 345/158 |
| 2014/0176518 | A1* | 6/2014 | Min et al. ....................... 345/207 |
| 2014/0184502 | A1* | 7/2014 | Liu ................................ 345/158 |

FOREIGN PATENT DOCUMENTS

| EP | 2402842 | 1/2012 |
| GB | 2499274 | 8/2013 |
| WO | WO2011/124070 | 10/2011 |

OTHER PUBLICATIONS

He Zhao et al., "Motion Measurement Using Inertial Sensors, Ultrasonic Sensors, and Magnetometers with Extended Kalman Filter for Data Fusion," IEEE Sensors Journal, 12(5):943-953 (2012).
International Search Report and Written Opinion for corresponding Application No. PCT/US2013/044652, dated Nov. 26, 2013, pp. 1-18.

* cited by examiner

*Primary Examiner* — Chante Harrison
(74) *Attorney, Agent, or Firm* — Fish & Richardson P.C.

(57) ABSTRACT

In general, in one aspect, a method includes receiving data from one or more motion sensors of a mobile device and calculating, after the period of time, a statistical measurement of the motion sensor data. The method also includes comparing the calculated statistical measurement to one or more threshold values, and, based on the comparing, determining a dynamic state of the mobile device. The method also includes, based on the determined dynamic state, determining an orientation of the mobile device.

18 Claims, 10 Drawing Sheets

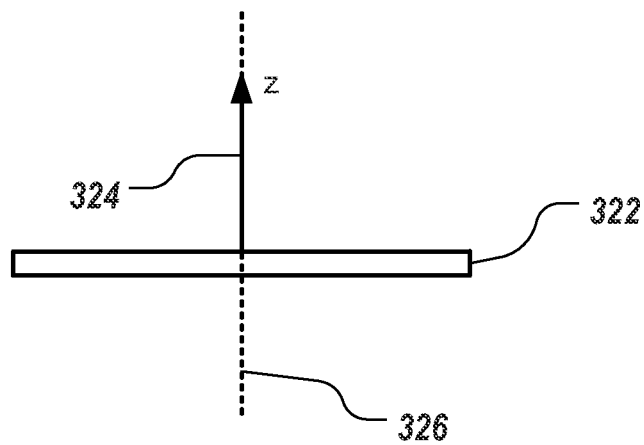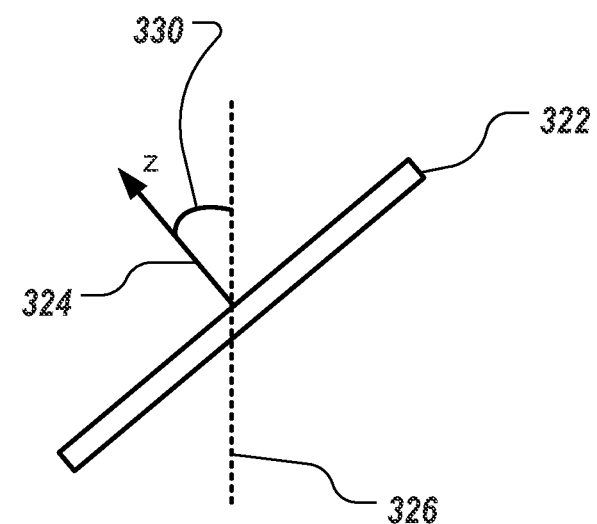
FIG. 3B

MULTI-STAGE DEVICE ORIENTATION DETECTION

TECHNICAL FIELD

The disclosure generally relates to mobile device displays and more particularly to determining a proper orientation of mobile device displays.

BACKGROUND

Many modern mobile devices include at least one visual display for displaying text, images and/or videos to a user. Determining the proper orientation of the mobile device display is more challenging than determining the proper orientation of a stationary device display due to its mobility. For example, a user may manipulate the physical orientation of a mobile device in three dimensions. Such changes in the physical orientation of a mobile device may make displayed information difficult for the user to view.

SUMMARY

In general, data collected from motion sensors of a mobile device may be used to determine a dynamic state of the mobile device. The mobile device may calculate a proper orientation of information displayed by the mobile device based on the determined dynamic state. For each possible dynamic state, the mobile device may calculate a proper display orientation using a different process and/or equation.

One innovative aspect of the subject matter described in this specification is embodied in methods that include the actions of: receiving data from one or more motion sensors of a mobile device; calculating, after a period of time, a statistical measurement of the motion sensor data; comparing the calculated statistical measurement to one or more threshold values; based on the comparing, determining a dynamic state of the mobile device; and based on the determined dynamic state, determining an orientation of the mobile device.

Other implementations of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other implementations can each optionally include one or more of the following features, alone or in combination. For example, the method may include displaying information on the mobile device based on the determined orientation of the mobile device. Calculating the statistical measurement of the stored motion sensor data may include calculating a standard deviation of the stored motion sensor data and an arithmetic mean of the stored motion sensor data.

Determining the dynamic state of the mobile device may include: determining that the mobile device is in a first dynamic state when the calculated statistical measurement is less than a first threshold; determining that the mobile device is in a second dynamic state when the calculated statistical measurement is greater than or equal to the first threshold and less than a second threshold; and determining that the mobile device is in a third dynamic state when the calculated statistical measurement is greater than or equal to a third threshold.

Determining the orientation of the mobile device may include: analyzing the stored motion sensor data to determine the orientation of the mobile device according to a first process when the dynamic state is determined to be the first dynamic state; and analyzing the stored motion sensor data to determine the orientation of the mobile device according to a second process when the dynamic state is determined to be the second dynamic state.

Determining the orientation of the mobile device further may include maintaining a previous orientation of the displayed information when the dynamic state is determined to be the third dynamic state. Receiving data from the one or more motion sensors of the mobile device may include receiving data from an accelerometer and data from a gyroscope. Calculating the statistical measurement of the motion sensor data may include calculating a first statistical measurement of the received accelerometer data and calculating a second statistical measurement of the received gyroscope data. Comparing the calculated statistical measurement to the one or more threshold values may include comparing the calculated first statistical measurement to a first set of one or more threshold values and comparing the calculated second statistical measurement to a second set of one or more threshold values.

Another innovative aspect of the subject matter described in this specification is embodied in methods that include the actions of: receiving data from one or more motion sensors of a mobile device; determining whether the received motion sensor data indicates that the mobile device is transitioning between a position in which information is displayed by the mobile device in a first orientation and a position in which information is displayed by the mobile device in a second orientation; based on the determining, selecting a set of thresholds from a plurality of different sets of thresholds; determining a dynamic state of the mobile device; and based on the determined dynamic state and the selected set of thresholds, determining an orientation of the mobile device.

Another innovative aspect of the subject matter described in this specification is embodied in methods that include the actions of: receiving data from one or more motion sensors of a mobile device; based on the received motion sensor data, determining that the mobile device has transitioned between a portrait orientation and a landscape orientation; based on the received motion sensor data, determining that the mobile device has transitioned between a position in which a display surface of the mobile device is tilted toward a direction of gravity and a position in which the display surface of the mobile device is approximately perpendicular to the direction of gravity; and based on determining that the mobile device has transitioned between the portrait orientation and the landscape orientation and determining that the mobile device has transitioned between the position in which the display surface of the mobile device is tilted toward the direction of gravity and the position in which the display surface of the mobile device is approximately perpendicular to the direction of gravity, determining that a user of the mobile device is interacting with the mobile device in a lying position.

Particular implementations provide at least the following advantages: 1) more flexible use of a mobile device in varying scenarios of user activity; 2) increased readability of information displayed by the mobile device, regardless of the level of activity of the user; and 3) faster, more accurate re-orientation of displayed information based on changes in the orientation of the mobile device.

Details of one or more implementations are set forth in the accompanying drawings and the description below. Other features, aspects, and potential advantages will be apparent from the description and drawings, and from the claims.

DESCRIPTION OF DRAWINGS

FIG. 3B is an illustration of an example of the tilt angle referred to in FIG. 3A.

Like reference symbols in the various drawings indicate like elements.

DETAILED DESCRIPTION

Figure 1:
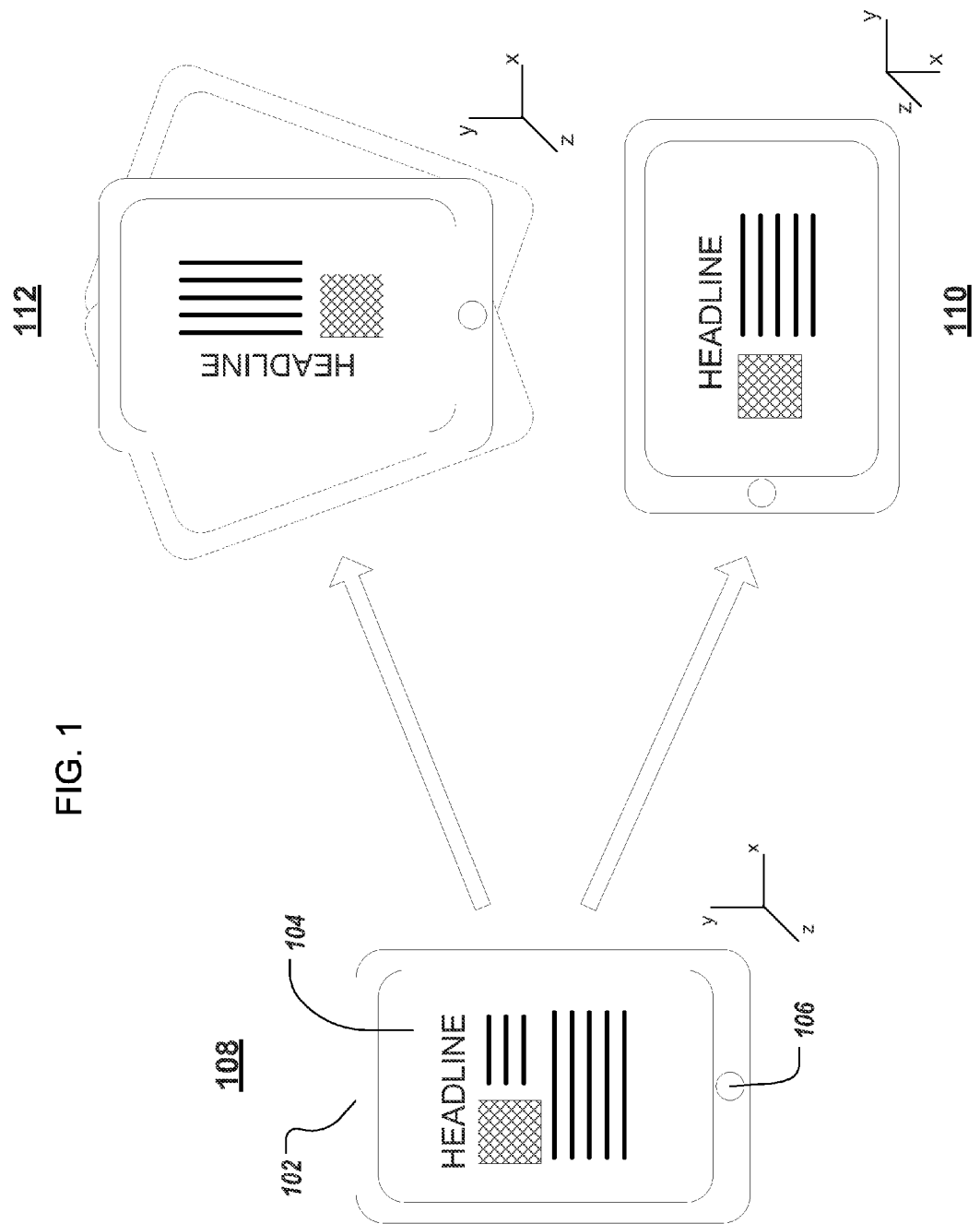
FIG. 1 illustrates examples of an example mobile device in varying dynamic states with varying examples of display orientation.

FIG. 1 illustrates examples of an example mobile device in varying dynamic states with varying examples of display orientation. Mobile device 102 may include, for example, a display device 104 and one or more controls 106. The display device 104 may display information to a user (e.g., text, images, and/or video). The one or more controls 106 may be manipulated or otherwise interacted with by a user to control the operation of the mobile device 102. For reference purposes, the mobile device 102 will be described with respect to x-, y-, and z-axes of a Cartesian coordinate frame. In this example, the x-axis runs parallel to a short edge of the mobile device 102, the y-axis runs parallel to a long edge of the mobile device, and the z-axis extends orthogonal to the planar surface of the display device 104. However, these references axes are being relied upon solely for ease of illustration and other reference axes also could be used. Though the mobile device 102 is being described, for descriptive purposes, as having "long" and "short" edges, the mobile device 102 may take any configuration.

In state 108, the mobile device 102 is positioned in an "upright portrait" orientation. Specifically, the positive y-axis of mobile device 102 is oriented substantially parallel to but in the opposite direction of gravity. The mobile device 102 may be configured to determine that it is oriented in the upright portrait position. Based on the determined orientation, the mobile device 102 may determine how information should be displayed by display 104. For example, when the mobile device 102 is displaying a news story on display 104, the mobile device 102 may determine its orientation and determine the direction in which the text and any images associated with the news story should be displayed to allow a user to properly view it. Thus, as shown in FIG. 1, when the mobile device 102 is steadily held in an "upright portrait" orientation, the mobile device 102 may determine that the text and images associated with a news story displayed by display 104 should be displayed in a corresponding upright portrait orientation.

However, a user may change the orientation of the mobile device 102. For example, a user may rotate the mobile device 102 clockwise 90-degrees around the z-axis such that the positive x-axis is oriented substantially parallel to and in the same direction as gravity. Thus rotated, the mobile device 102 is positioned in a "right-hand landscape" orientation, as shown in state 110. As shown in FIG. 1, when the mobile device 102 is steadily held in a "right-hand landscape" orientation, the mobile device 102 may determine that the text and images associated with a news story displayed by the display 104 should be displayed in a corresponding right-hand landscape orientation.

From state 108, a user may similarly rotate the mobile device 102 counter-clockwise 90 degrees around the z-axis into a "left-hand landscape" position or 180-degrees around the z-axis into an "upside-down portrait" position. When the mobile device 102 is held steadily in these positions, the mobile device 102 should display information in corresponding left-hand landscape and upside-down portrait orientations, respectively.

When the mobile device 102 is held relatively motionless, determining a proper orientation with which information should be displayed on the display 104 is generally straightforward. In particular, the mobile device 102 may determine its orientation through the use of one or more sensors included in the mobile device 102. For example, the mobile device 102 may include one or more accelerometers. The operation of accelerometers is well known and will not be described in detail herein. For illustrative purposes, though, an accelerometer included in the mobile device 102 will be described as a triaxial accelerometer that outputs acceleration values along each of the three axes of the mobile device 102 (e.g., $<a_x, a_y, a_z>$). However, any type of accelerometer producing any type of output may be included in the mobile device 102 and utilized to similar effect.

Based on data received from the accelerometer, the mobile device 102 may estimate the direction of gravity with respect to the mobile device 102 and use the estimated direction of gravity to determine the orientation of the mobile device 102. For example, when the mobile device is held steadily as shown in state 108, the accelerometer may output values indicating that a vector representing gravity is oriented substantially parallel to but in the opposite direction of the positive y-axis of the mobile device 102. Thus, in the upright portrait orientation of state 108, the accelerometer may return values of $<0, -a_y, 0>$, assuming the mobile device 102 is held nearly motionless. Similarly, in the upside-down portrait orientation, the accelerometer may return values of $<0, a_y, 0>$. In the right-hand landscape orientation, the accelerometer may return values of $<a_x, 0, 0>$. In the left-hand landscape orientation, the accelerometer may return $<-a_x, 0, 0>$. If the user were to place the mobile device face-up on a level surface (i.e., a "face-up" orientation), the accelerometer may return values of $<0, 0, -a_z>$. Similarly, if the user were to place the mobile device face-down on a level surface (i.e., a "face-down" orientation), the accelerometer may return values of $<0, 0, a_z>$.

Of course, a user is not always going to hold the mobile device exactly in any one of the above-described primary orientations (i.e., upright portrait, upside-down portrait, right-hand landscape, left-hand landscape, face-up, or face-down). For example, from state 108, a user may rotate the mobile device 102 thirty degrees around the x-axis, such that the mobile device 102 is tilted slightly. In such a position, the accelerometer may return values <0, −0.866, −0.5>, assuming the mobile device 102 is held nearly motionless. These returned values do not correspond exactly to any of the sets of values associated with any of the primary orientations.

In some implementations, the mobile device 102 may estimate the primary orientation to which its current orientation most closely corresponds. Thus, the mobile device 102 may determine that the returned value with the largest magnitude corresponds to the y-axis and that this value is negative (e.g., −0.866). The mobile device 102 may then determine that the returned acceleration values most closely correspond to the upright portrait orientation, because in the returned values <0, −$a_y$, 0> associated with the upright portrait orientation, the returned value with the largest magnitude corresponds to the y-axis and it is a negative value (i.e., −$a_y$).

However, the mobile device 102 will not always be held completely stationary. For example, a user may move while operating the mobile device 102 (e.g., when a user changes seating positions or is riding in a vehicle), causing the mobile device 102 to accelerate along one or more of its axes even though the user is attempting to hold the mobile device 102 steady. Thus, the values returned by the accelerometer included in the mobile device 102 may change very quickly over a period of time, indicating that the mobile device 102 is in a dynamic state. In a situation where a user is attempting to read a news story displayed on mobile device 102, it may be inappropriate to change the orientation of the news story on the display 104 based on the motion detected by the accelerometer, particularly when the mobile device 102 is in such a dynamic state.

For example, as shown in state 112, a user riding in a moving vehicle may be holding mobile device 102 in an up-right portrait orientation. Movement of the vehicle may cause the accelerometer to return values that, at any given moment, more closely corresponds to another of the primary orientations. However, because the user is attempting to hold the device in the up-right portrait orientation, it would likely be inappropriate for the mobile device 102 to change the orientation of the news story to correspond to a right-hand landscape orientation, as shown.

As will be described in greater detail below, the mobile device 102 may therefore account for the dynamic state of the mobile device 102 when estimating the orientation of the mobile device 102 and, consequently, determining the orientation of the information displayed by display 104.

Mobile device 102 has thus far been described as estimating its orientation and determining how to display information based on the estimated orientation. However, one or more distinct processes may perform each of these tasks separately. For example, in some implementations, one or more processors included in the mobile device 102 may execute a first process that estimates the current orientation of the mobile device 102 and forwards the estimated orientation to one or more other processes that provide information to be displayed on display 104 and utilize the estimated orientation to determine how to display the information.

Figure 2:
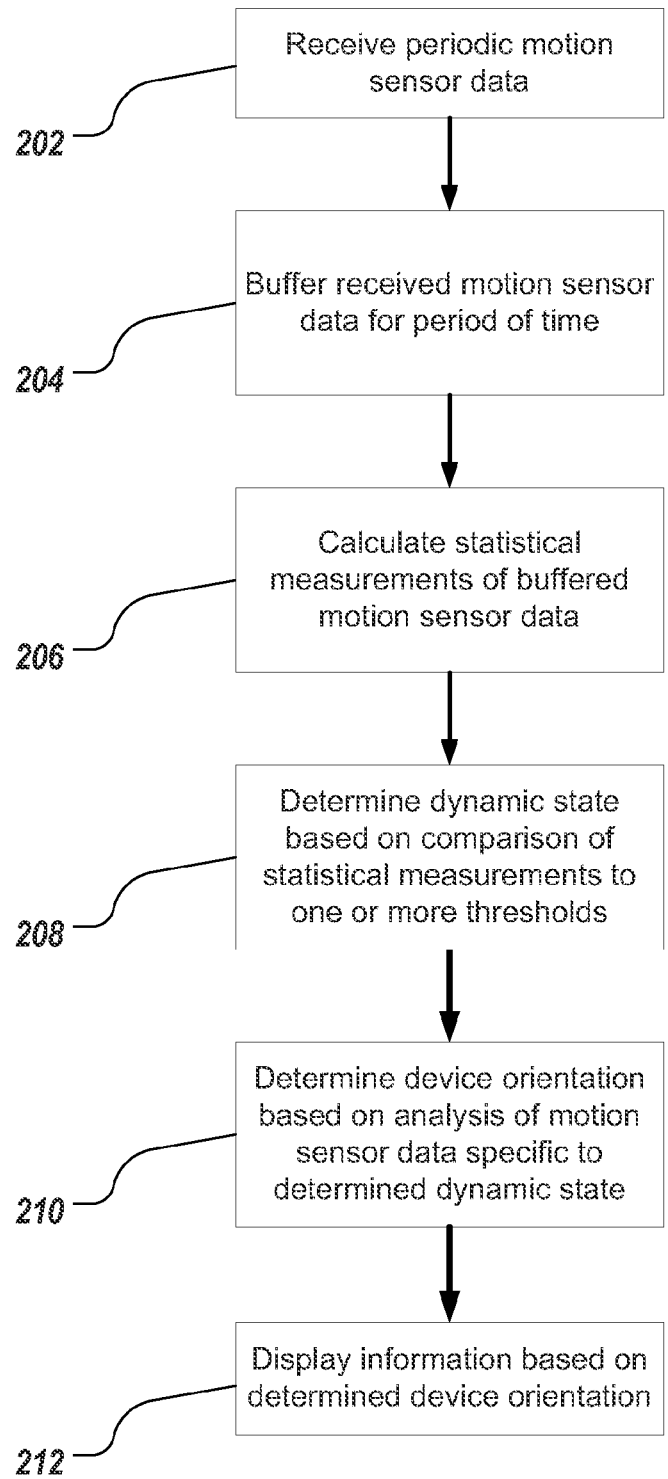
FIG. 2 is a flow diagram of an example process for determining a proper display orientation of a mobile device.

FIG. 2 is a flow diagram of an example process 200 for determining a proper display orientation of a mobile device. The mobile device may be, for example, the mobile device 102 described above with regard to FIG. 1.

The mobile device receives periodic data from one or more motion sensors of the mobile device (202). As described above, the one or more motion sensors may include an accelerometer. Additionally, the one or more motion sensors may include a gyroscope. In some implementations, the gyroscope may return a set of values indicating the rate of rotation of the mobile device about each of its axes (i.e., <$r_x$, $r_y$, $r_z$>). The one or more motion sensors may be any type of sensors that detect or estimate motion, acceleration, and/or rotation of the mobile device and that may be used alone or in combination to estimate an orientation of the mobile device with respect to gravity. The mobile device may receive the data from the one or more motion sensors at set intervals (e.g., every 100 milliseconds). In some implementations, the interval at which the mobile device receives the data from the one or more motion sensors may vary based on the state of the mobile device.

The mobile device stores, in a buffer, the received data from the one or more motion sensors over a period of time (204). For example, the mobile device may maintain a two-second buffer of the data received from the one or more motion sensors. Thus, where the mobile device receives data from an accelerometer and a gyroscope every 100 milliseconds and maintains a two second-buffer, the buffer would store twenty sets of accelerometer data and twenty sets gyroscope data. The period of time during which the received sensor data is stored in the buffer may be any appropriate length. Generally, the period of time should be of a length to store enough data to accurately estimate the dynamic state of the mobile device and a gravity vector of the mobile device.

The buffers described herein may be, for example, data structure and/or sets of related memory locations. Moreover, the buffer may exist in RAM, ROM, or any other type of memory or computer readable storage device.

The mobile device calculates various statistical measurements of the motion sensor data stored in the buffer (206). For example, the mobile device may calculate the arithmetic mean (equation 1) and/or the standard deviation (equation 2) of the buffered data.

$$m = \frac{1}{N}\sum_{i=1}^{N} \vec{a}_i, \quad \text{(equation 1)}$$

$$\sigma = \sqrt{\frac{\sum_{i=1}^{N} \vec{a}_i^2}{N} - \left(\frac{\sum_{i=1}^{N} \vec{a}_i}{N}\right)^2}, \quad \text{(equation 2)}$$

where N is the number of accelerometer data vectors stored in the buffer and $\vec{a}_i$ is an accelerometer data vector stored in the buffer.

Additionally, the mobile device may determine the magnitude of the arithmetic mean and/or the maximum value of the standard deviation of the buffered data. However, any statistical measurements may be used that provide an indication of the nature of the buffered motion sensor data.

The mobile device compares the calculated statistical measurements of the motion sensor data to one or more thresholds to determine a dynamic state of the mobile device (208). As will be described in greater detail below with regard to FIGS. 3A and 4, the calculated statistical measurements of the buffered motion sensor data provide an indication of the distribution of the values of the data and an average magnitude of the data. Based on these statistical measurements, the mobile device is able to determine the type of motion that is being imparted on it.

For example, the buffered motion sensor data may include generally consistent values, but may include one or two prominent changes or "spikes" in the values. By calculating the standard deviation of the buffered data, the mobile device may determine that, over the period of time represented by the buffered data, the motion of the mobile device was generally constant. Similarly, the standard deviation of the buffered data may indicate constant changes in the motion of the mobile device over the represented period of time.

Depending on the comparison of the calculated statistical measurements to the one or more thresholds, the mobile device may categorize the level of motion detected by the sensors. For example, the mobile device may categorize the motion detected by the sensors into three levels of dynamic state: low dynamic, dynamic, and high dynamic. A low dynamic state may indicate that the mobile device is in or near a steady state. A dynamic state may indicate that the mobile device is experiencing periods of mild change in motion. A high dynamic state may indicate that the mobile device is experiencing consistent and large changes in motion. However, the mobile device may categorize the detected motion into any number of levels or may use any other method of differentiating between a plurality of dynamic states.

The mobile device analyzes the buffered motion data in a manner specific to the determined dynamic state and determines an orientation of the mobile device (210). As will be described in greater detail below with regard to FIGS. 5 and 6, the mobile device may use a different process and/or different inputs to a process, depending on the dynamic state in which the mobile device is determined to be. In some implementations, for example, the mobile device may estimate a gravity vector associated with the mobile device based on the most recently received data from the accelerometer when the mobile device is determined to be in the low dynamic state. Alternatively, the mobile device may estimate a gravity vector associated with the mobile device based on an average of the buffered accelerometer data when the mobile device is determined to be in the dynamic state. The mobile device may determine its orientation based on the determined gravity vector. However, if the mobile device is determined to be in the high dynamic state, it may lock the orientation of the mobile device until the mobile device is no longer determined to be in a high dynamic state.

Once the mobile device determines its current orientation, it may determine how to display information on its display (212).

Figure 3A:
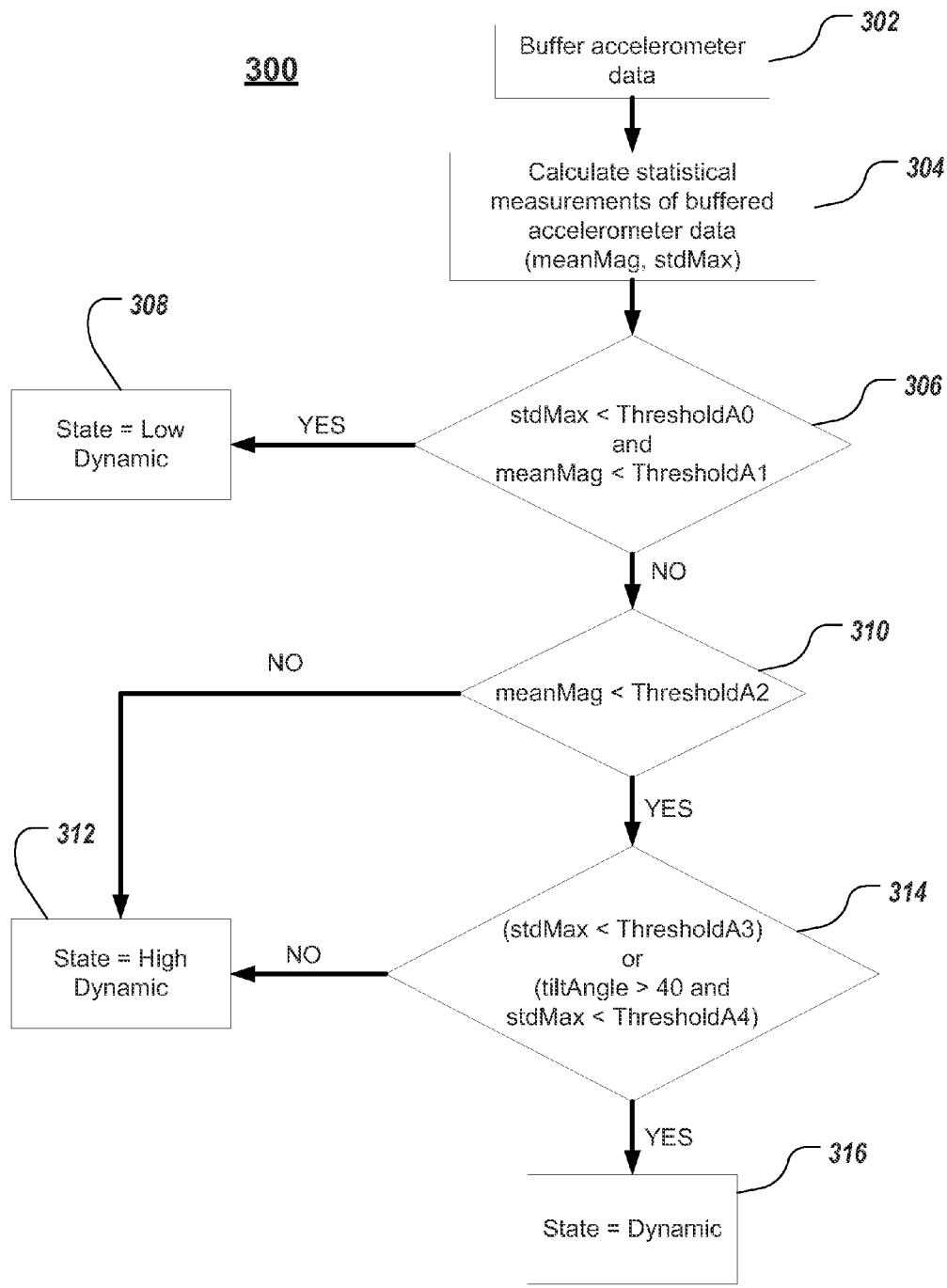
FIG. 3A is a flow diagram of an example process for determining a dynamic state of a mobile device based on accelerometer data.

FIG. 3A is a flow diagram of an example process 300 for determining a dynamic state of a mobile device based on accelerometer data. The mobile device may be, for example, the mobile device 102 and/or the mobile device referred to with regard to FIG. 2. For illustrative purposes, the process 300 is described with regard to three dynamic states. However, the process 300 may be scaled to accommodate any number of dynamic states.

As described above, the mobile device stores, in a buffer, the received data from the accelerometer over a period of time (302). The mobile device calculates one or more statistical measurements of the buffered accelerometer data (304). Specifically, the mobile device may calculate the magnitude of the arithmetic mean of the buffered accelerometer data and the maximum of the standard deviation of the buffered accelerometer data.

The mobile device determines whether the calculated magnitude of the arithmetic mean is less than a first threshold A0 and the maximum of the standard deviation is less than a second threshold A1 (306). The first threshold A0 and the second threshold A1 are essentially floor thresholds. If both the arithmetic mean is below the first threshold A0 and the maximum of the standard deviation is below the second threshold A1, the mobile device determines the state to be low dynamic.

If either the arithmetic mean is greater than or equal to the first threshold A0 and the maximum of the standard deviation is greater than or equal to the second threshold A1, the mobile device determines whether the magnitude of the arithmetic mean is less than a third threshold A2 (310). The third threshold A2 is essentially a ceiling threshold. If the magnitude of the arithmetic mean is greater than or equal to the third threshold A2, the mobile device determines the state to be high dynamic.

If, however, the magnitude of the arithmetic mean falls between the second threshold A1 and the third threshold A2, the mobile device determines whether one of two conditions are met (314). First, the mobile device determines whether the maximum of the standard deviation is less than a fourth threshold A3. Like the third threshold A2, the fourth threshold A3 is essentially a ceiling threshold for the maximum of the standard deviation. Second, the mobile device determines whether the tilt angle of the mobile device is greater than forty degrees and the maximum of the standard deviation is less than a fifth threshold A4. If either (1) the maximum of the standard deviation is less than a fourth threshold A3 or (2) the tilt angle of the mobile device is greater than forty degrees and the maximum of the standard deviation is less than a fifth threshold A4, the mobile device determines the state to be dynamic (316). Otherwise, the mobile device determines the state to be high dynamic.

The five thresholds A0-A4 may be set to any levels depending the desired level of sensitivity of the mobile device to variations in its position. If the five thresholds A0-A4 are set high, the mobile device will determine that it is in a low dynamic state over a range of motion greater than if the five thresholds A0-A4 were set low. As a result, the mobile device will more quickly determine a change in orientation up to a higher threshold of motion. Alternatively, if the five thresholds A0-A4 are set low, the mobile device will determine that it is in a dynamic and high dynamic state at a lower change in motion than if the five thresholds A0-A4 were set high. As a result, the mobile device will be more likely to maintain its determined orientation over a longer period before changing. In some implementations, the process 300 may utilize a lesser or greater number of thresholds. Moreover, the process 300 may utilize a different set of statistical measurements of the buffered sensor data.

FIG. 3B is an illustration of an example of the tilt angle referred to in FIG. 3A. Tilt angle may be defined as the angle by which an axis of the mobile device deviates from a fixed axis in space. For example, FIG. 3B shows the tilt angle as being the angle by which the z-axis of the mobile device (i.e., the axis that extends orthogonal to the planar surface of a display of the mobile device) deviates from an axis parallel to gravity that passes through the center of the mobile device. In other words, the tilt angle shown in FIG. 3B measures the angle at which the mobile device is tilted with respect to gravity.

In state 320, the mobile device 322 is shown as being positioned in a "face up" orientation. Thus, the z-axis 324 of the mobile device is substantially parallel to an axis 326 that represents gravity. When the mobile device 322 is rotated about either or both of the x- and y-axes into state 328, the z-axis 324 deviates from the axis 326 that represents gravity by a tilt angle 330. Though tilt angle is illustrated in FIG. 3B and applied in FIG. 3A as a relationship between the z-axis of the device and an axis parallel to gravity that passes through the center of the mobile device, tilt angle can be calculated with respect to any axis of the mobile device and any other fixed axis in space that passes through the center of the mobile device.

The mobile device may optionally include a gyroscope and may use data collected from the gyroscope to further refine the process of determining the dynamic state of the mobile device.

Figure 4:
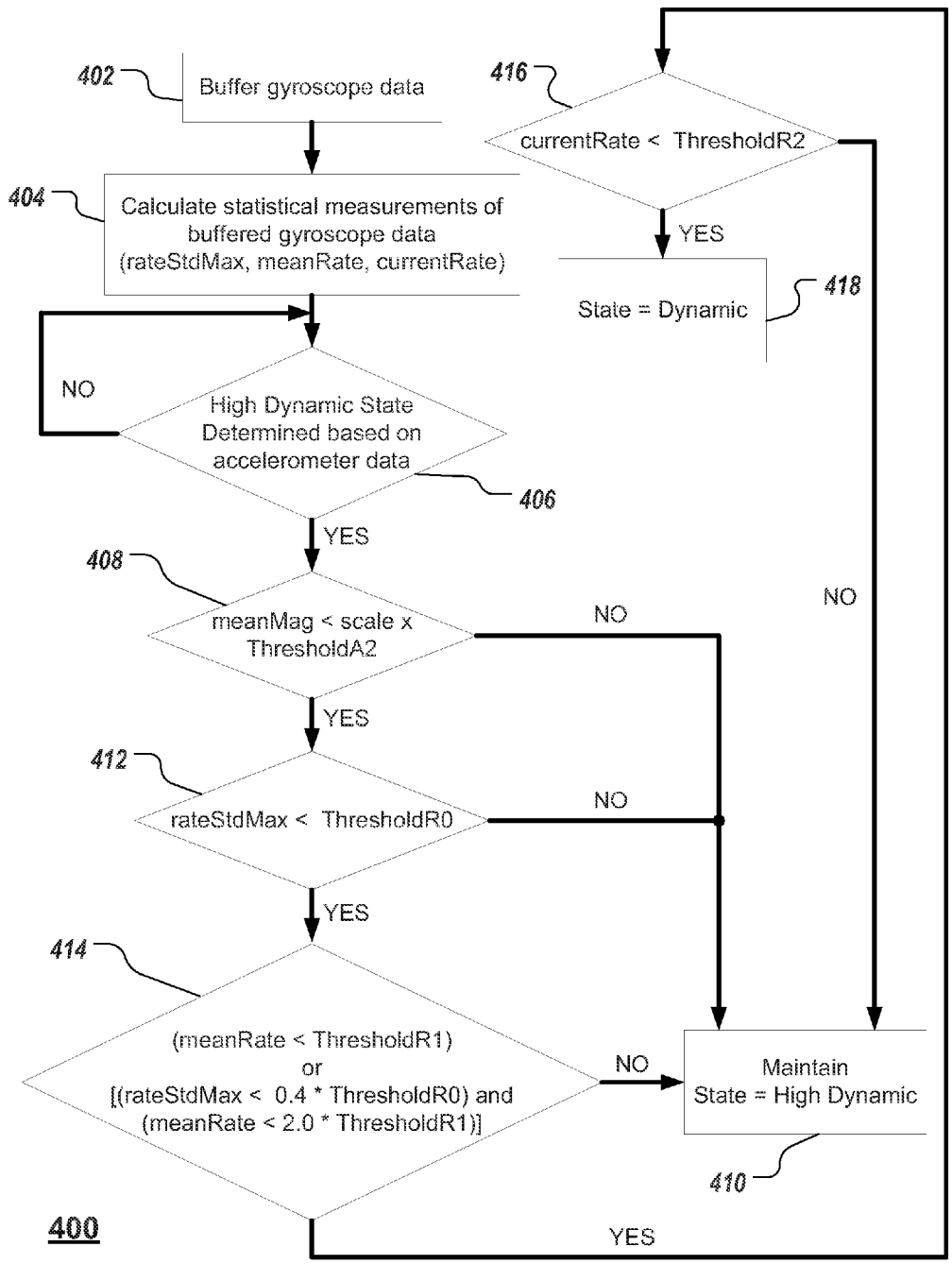
FIG. 4 is a flow diagram of an example process for determining a dynamic state of a mobile device based on gyroscope data.

FIG. 4 is a flow diagram of a process 400 for determining a dynamic state of a mobile device based on gyroscope data. The process 400 is optional, even when a gyroscope is included in the mobile device. Some gyroscopes require significant power to operate, particularly in addition to the above-described accelerometer. Therefore, to save power, the process 400 may be omitted or utilized in limited circumstances.

When process 400 is utilized, the mobile device stores, in one or more buffers, the received gyroscope data (402). In some implementations, the gyroscope data is buffered twice (i.e., "double buffering"). For a first period of time, the data received from the gyroscope may be stored in a first buffer. Once the first period of time has passed, the data in the first buffer may be averaged and the average value(s) of the data stored in the first buffer may be stored in a second buffer. For example, the arithmetic mean of the value(s) stored in the first buffer may be stored in the second buffer. The first buffer may again be filled for first period of time. The mobile device again calculates the average of the values stored in the first buffer and stores the result in the second buffer. This process continues for a second period of time, which is a multiple of the first period of time.

Double buffering the received gyroscope data necessarily discards any small and/or quick variations in the received data and will more accurately reflect more significant changes in the gyroscope data that are sustained over a longer period of time. The mobile device may buffer any of the data received from the one or more motion sensors any number of times, in a manner similar to that described above. For illustrative purposes, however, the process 400 will be described with respect to double buffering the gyroscope data.

After the second buffer is full, the mobile device calculates various statistical measurements of the averaged gyroscope data stored in second the buffer (404). For example, the mobile device may calculate the magnitude of the arithmetic mean and/or the standard deviation of the averaged gyroscope data stored in the second buffer. However, other statistical measurements of the data stored in the second buffer may be used in process 400.

The mobile device determines whether its current state has been determined as a high dynamic state based on data received from the accelerometer (406). Thus, in some implementations, the mobile device only proceeds with the remaining operations of process 400 when the result of process 300 indicates that the mobile device is in the high dynamic state. If the mobile device has not determined it is in a high dynamic state, the process 400 does not proceed. In some implementations, the process 400 may continuously poll to determine whether the mobile device has entered a high dynamic state. In other implementations, the process 400 pauses until pauses until the mobile devices enters a high dynamic state or simply exits.

When it is determined that the mobile device is in a high dynamic state, the mobile device determines whether the magnitude of the arithmetic mean of the buffered accelerometer data is less than a scaling multiple of the third threshold A2 (408). If the magnitude of the arithmetic mean of the buffered accelerometer data is greater than or equal to a scaling multiple of the third threshold A2, the mobile device maintains the state as high dynamic (410). In other words, where the arithmetic mean of the buffered accelerometer data significantly exceeds the third threshold A2, there is no need for the mobile device to rely upon the received gyroscope data, because in such cases the acceleration of the mobile device is so great that a high dynamic state is assumed.

In some implementations, one or more of operations 406 and 408 may occur prior to one or more of operations 402 and 404. In these implementations, gyroscope data is stored and analyzed only where the mobile device is in a high dynamic state and/or the arithmetic mean of the buffered accelerometer data significantly exceeds a ceiling used in process 300. By placing one or more of operations 406 and 408 before one or more of operations 402 and 404, the mobile device can reduce the amount of times that gyroscope data is collected and analyzed, reducing the mobile device's power consumption.

If the magnitude of the arithmetic mean of the buffered accelerometer data is less than the scaling multiple of the third threshold A2, the mobile device determines whether the maximum standard deviation of the double-buffered gyroscope data is less than a sixth threshold R0 (412). If not, the mobile device maintains the state at high dynamic (410). In other words, when the maximum standard deviation of the double-buffered gyroscope data is greater than or equal to the sixth threshold R0, the mobile device is exhibiting inconsistent rotation around the axes of the mobile device (e.g., the mobile device is being shaken rapidly in all different directions), so the mobile device is likely in a high dynamic state.

However, if the maximum standard deviation of the double-buffered gyroscope data is less than a sixth threshold R0, the mobile device determines whether one of two conditions is met (414). First, the mobile device determines whether the magnitude of the arithmetic mean of the double-buffered gyroscope data is less than a seventh threshold R1. The magnitude of the arithmetic mean of the double-buffered gyroscope data being less than the seventh threshold R1 indicates that the mobile device is being rotated at a measured or moderate pace about one or more of its axes. Second, the mobile device determines whether the maximum of the standard deviation of the double-buffered gyroscope data is less than a fraction (e.g., 0.4) of the sixth threshold R0 and the magnitude of the arithmetic mean of the double-buffered gyroscope data is less than a multiple (e.g., 2.0) of the seventh threshold R1. The standard deviation of the double-buffered gyroscope data being less than a fraction of the sixth threshold R0 and the magnitude of the arithmetic mean of the double-buffered gyroscope data being less than a multiple of the seventh threshold R1 would indicate that the mobile device is being rotated at a quicker pace around one or more of its axes than allowed by the seventh threshold R1 but is being accelerated in a more consistent manner than required by the sixth threshold R0. If neither one of these two conditions are met, the mobile device maintains that state as high dynamic (410).

If, however, the mobile device determines either (1) that the magnitude of the arithmetic mean of the double-buffered gyroscope data is less than a seventh threshold R1 or (2) that the maximum of the standard deviation of the double-buffered gyroscope data is less than a fraction of the sixth threshold R0 and the magnitude of the arithmetic mean of the double-buffered gyroscope data is less than a multiple of the seventh threshold R1, the mobile device determines whether the magnitude of the rate of rotation data most recently received from the gyroscope is less than an eighth threshold R2. Essentially, the magnitude of the rate of rotation data most recently received from the gyroscope indicates how vigorously the mobile device is currently being rotated. Thus, a high magnitude of the rate of rotation data most recently received from the gyroscope indicates that the mobile device is being rotated quickly around one or more of its axes.

If the magnitude of the rate of rotation data most recently received from the gyroscope is greater than or equal to the eighth threshold R2, that state is maintained as high dynamic (410). However, if the magnitude of the rate of rotation data most recently received from the gyroscope is less than the eighth threshold R2, the mobile device changes the state to dynamic.

Figure 5:
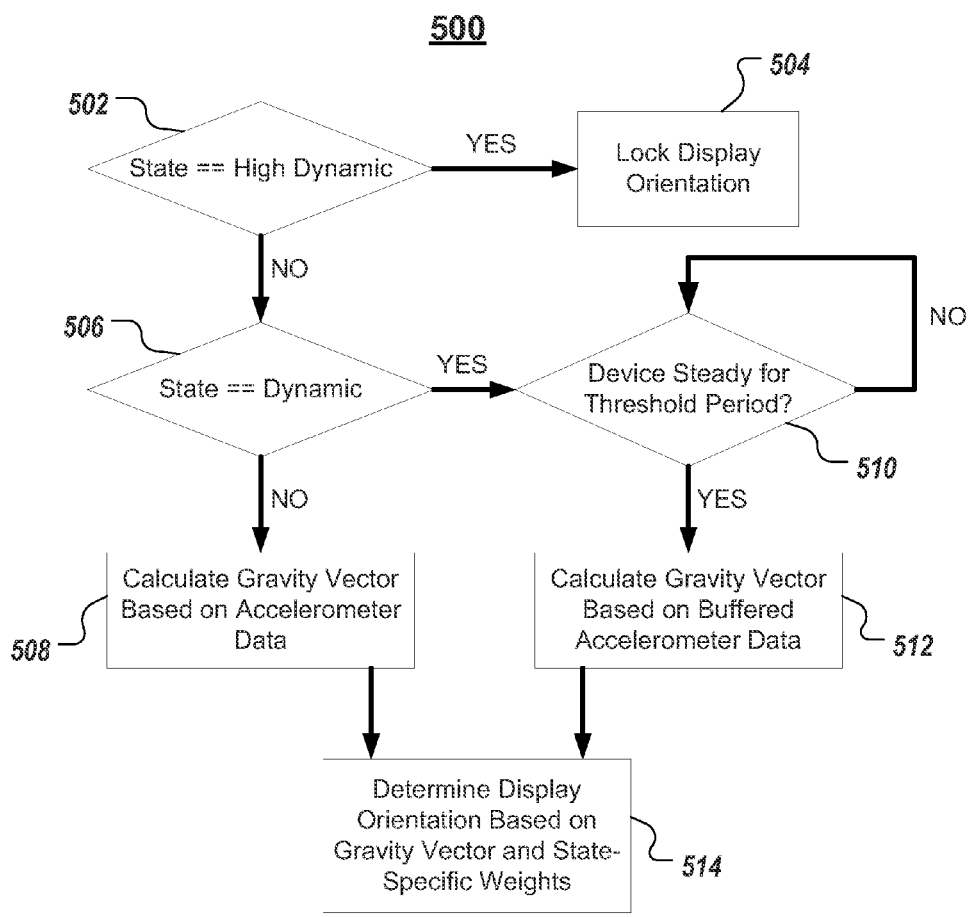
FIG. 5 is a flow diagram of an example process for determining a gravity vector for a mobile device based on a dynamic state of the mobile device.

The mobile device uses the dynamic state determined from one or both of process 300 and 400 to determine an orientation of the mobile device. FIG. 5 is a flow diagram of a process 500 for determining a gravity vector for a mobile device based on a dynamic state of the mobile device. Specifically, the process 500 sets the gravity vector and weights used in process 600 (i.e., minW and minΔW) such that the mobile device is more responsive to changes in position when the mobile device is in a low dynamic state and less responsive to changes in position when the mobile device is in a dynamic state.

The mobile device determines whether the state is currently high dynamic (502). If the mobile device is in a high dynamic state, the mobile device locks its display orientation (504), such that no movement of mobile device will result in a change of the display orientation until the mobile device is no longer in the high dynamic state. The mobile device locks its display orientation when in the high dynamic state because the data received from the one or more motion sensors is considered too unreliable.

If the mobile device is not in a high dynamic state, the mobile device determines whether the state is currently dynamic (506). If the mobile device is not in either a high dynamic or dynamic state (i.e., if the device is in a low dynamic state), the mobile device sets the gravity vector equal the most recently received accelerometer data (508). In other words, in a low dynamic state where the mobile device is moved at a moderate and steady pace, the gravity vector may be set to the raw accelerometer data, because the accelerometer data is reliable. When the gravity vector is set to the most recent accelerometer data, the mobile device is the most responsive in determining its current orientation.

If the mobile device determines that it is currently in a dynamic state, the mobile device waits until it is steady for a predetermined period (510). The mobile device may determine whether it is steady in a number of different manners. For example, the mobile device may wait until the maximum of the standard deviation of the buffered accelerometer data is below a certain threshold for a predetermined period of time to determine that the mobile device is steady. Alternatively, the mobile device may wait until the magnitude of the arithmetic mean of the buffered accelerometer data is below a certain threshold for a certain amount of time to determine that the mobile device is steady. Once the mobile device determines that it is steady, it sets the gravity vector equal to the arithmetic mean of the buffered accelerometer data (512). Thus, the gravity vector is an average of the accelerometer data over a period of time, allowing for a more accurate picture of the motion of the mobile device.

Once the accelerometer data has been set for either of the dynamic or low dynamic states, the mobile device determines its orientation based on the set gravity vector and a set of weights specific to the dynamic state (514).

Figure 6:
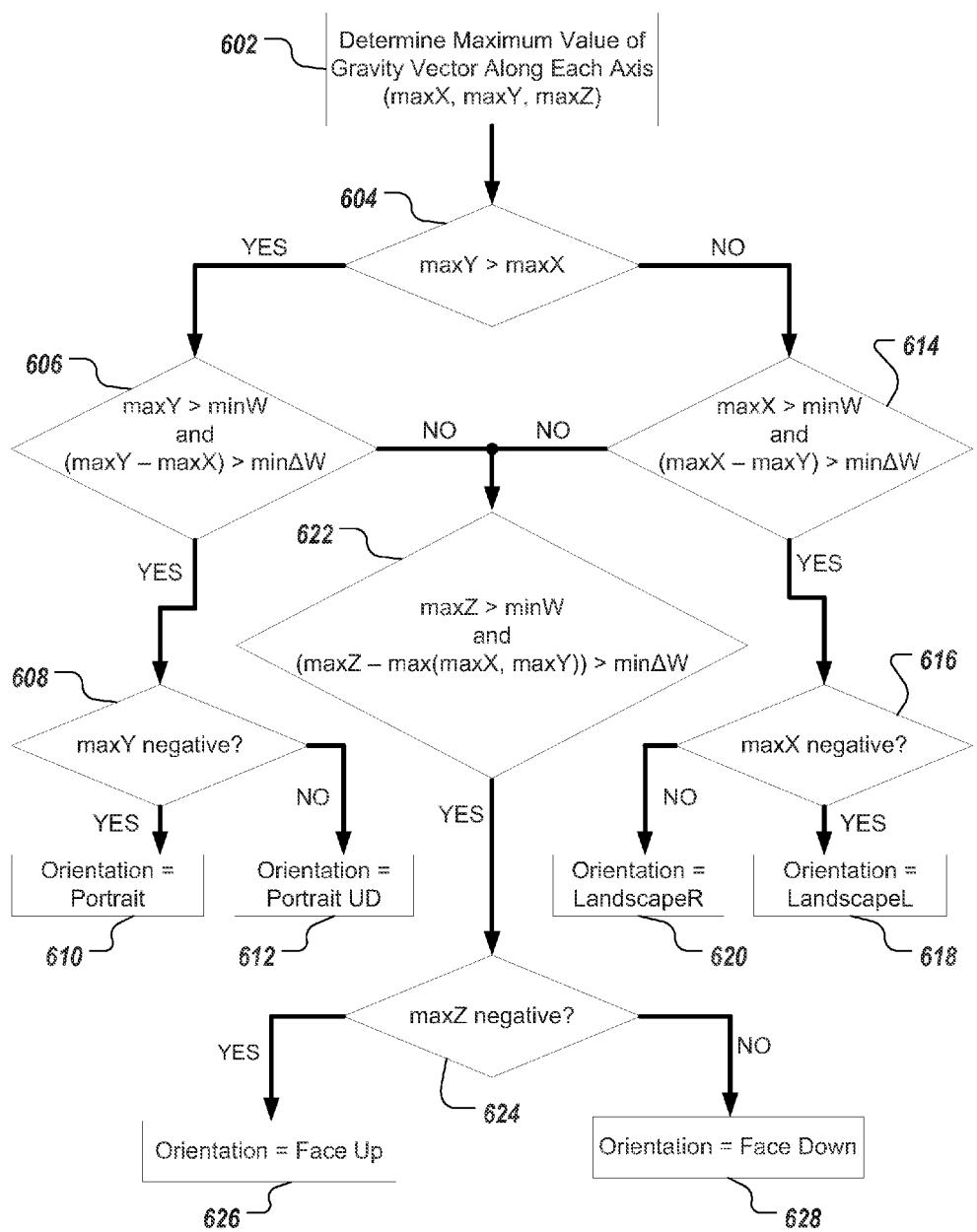
FIG. 6 is a flow diagram of an example process for determining a display orientation of a mobile device based on a gravity vector of the mobile device.

FIG. 6 is a flow diagram of a process 600 for determining a display orientation of a mobile device based on a gravity vector of the mobile device. Thus, in some implementations, the process 600 is used for operation 514 of process 500. The mobile device determines the maximum value of the gravity vector along each axis (602). The mobile device then compares the maximum value of the gravity vector along each axis to determine the current orientation of the mobile device.

Specifically, the mobile device determines whether the maximum value of the gravity vector along the y-axis is greater than the maximum value of the gravity vector along the x-axis (604). If so, the mobile device determines whether two condition are met (606). First, the mobile device determines whether the maximum value of the gravity vector along the y-axis is greater than a first weight minW. Second, the mobile device determines whether difference between the maximum value of the gravity vector along the y-axis and the maximum value of the gravity vector along the x-axis is greater than a second weight minΔW. If both conditions are met, the mobile device determines whether the maximum value of the gravity vector along the y-axis is positive or negative (608). If the maximum value of the gravity vector along the y-axis is negative, the mobile device determines that it is in the portrait orientation (610). If the maximum value of the gravity vector along the y-axis is positive, the mobile device determines that it is in the upside-down portrait orientation (612).

If, however, either the mobile device determines (1) that the maximum value of the gravity vector along the y-axis is less than or equal to the first weight minW, or (2) that the difference between the maximum value of the gravity vector along the y-axis and the maximum value of the gravity vector along the x-axis is less than or equal to the second weight minΔW, the process moves to operation (622), which will be described in greater detail below. As previously described with respect to FIG. 5, the first weight minW and the second weight minΔW are selected based on the current dynamic state of the mobile device. As a result, the first weight minW and the second weight minΔW may be selected such that the mobile device is more sensitive to a change in the gravity vector in the low dynamic state and less sensitive to a change in the gravity vector in the dynamic state.

If the mobile device determines that the maximum value of the gravity vector along the y-axis is less than or equal to the maximum value of the gravity vector along the x-axis, than the mobile device determines if two alternative conditions are met (614). First, the mobile device determines whether the maximum value of the gravity vector along the x-axis is greater than the first weight minW. Second, the mobile device determines whether difference between the maximum value of the gravity vector along the x-axis and the maximum value of the gravity vector along the y-axis is greater than the second weight minΔW. If both conditions as met, the mobile device determines whether the maximum value of the gravity vector along the x-axis is positive or negative (616). If the maximum value of the gravity vector along the x-axis is negative, the mobile device determines that it is in the landscape left orientation (618). If the maximum value of the gravity vector along the x-axis is positive, the mobile device determines that it is in the landscape right orientation (620).

If, however, either the mobile device determines (1) that the maximum value of the gravity vector along the x-axis is less than or equal to the first weight minW, or (2) that the difference between the maximum value of the gravity vector along the x-axis and the maximum value of the gravity vector along the y-axis is less than or equal to the second weight minΔW, the process moves to operation (622).

In operation (622), the mobile device determines whether (1) the maximum value of the gravity vector along the z-axis is greater than the first weight minW, and (2) that the difference between the maximum value of the gravity vector along the z-axis and the greater of the maximum value of the gravity vector along the x-axis and the maximum value of the gravity vector along the y-axis is greater than the second weight minΔW. If both conditions are met, than the mobile device determines whether the maximum value of the gravity vector along the z-axis is positive or negative (624). If the maximum value of the gravity vector along the z-axis is negative, the mobile device determines that it is in the face up orientation (626). If the maximum value of the gravity vector along the z-axis is positive, the mobile device determines that it is in the face-down orientation (628). If, however, the two conditions of operation (622) are not met, than the mobile device maintains its current orientation (not shown).

As described above with regard to operation 212 of FIG. 2, once the mobile device determines its current orientation, it may determine how to display information on its display. In some implementations, one or more processors included in the mobile device may execute any combination of processes 300, 400, 500, and/or 600 in order to determine the current orientation of the mobile device. The mobile device may then forward the determined current orientation to one or more other processes that provide information to be displayed on display 104 and utilize the estimated orientation to determine how to display the information. For example, the mobile device may forward the determined current orientation to a book reader application running on the mobile device and the book reader application may utilize the determined current orientation to determine how to display text and images include in a book being displayed to a user.

In determining the current orientation of the mobile device, the mobile device may determine whether a special user mode has been set. If a special user mode has been set, the mobile device may alter the process(es) for determining the current orientation of the mobile device based on the special user mode. These special user modes allow, in part, for a more accurate determination of the current orientation of the mobile device depending on the use of the mobile device. For example, the type of application being run and displayed by the mobile device may cause the setting of a special user mode. Additionally or alternatively, the manner in which the user is interacting with the mobile device may cause the setting of a special user mode. Two examples of special user modes are a rotate-to-orient mode and a bed-reading mode, which are described in FIGS. 7 and 8, respectively.

Figure 7:
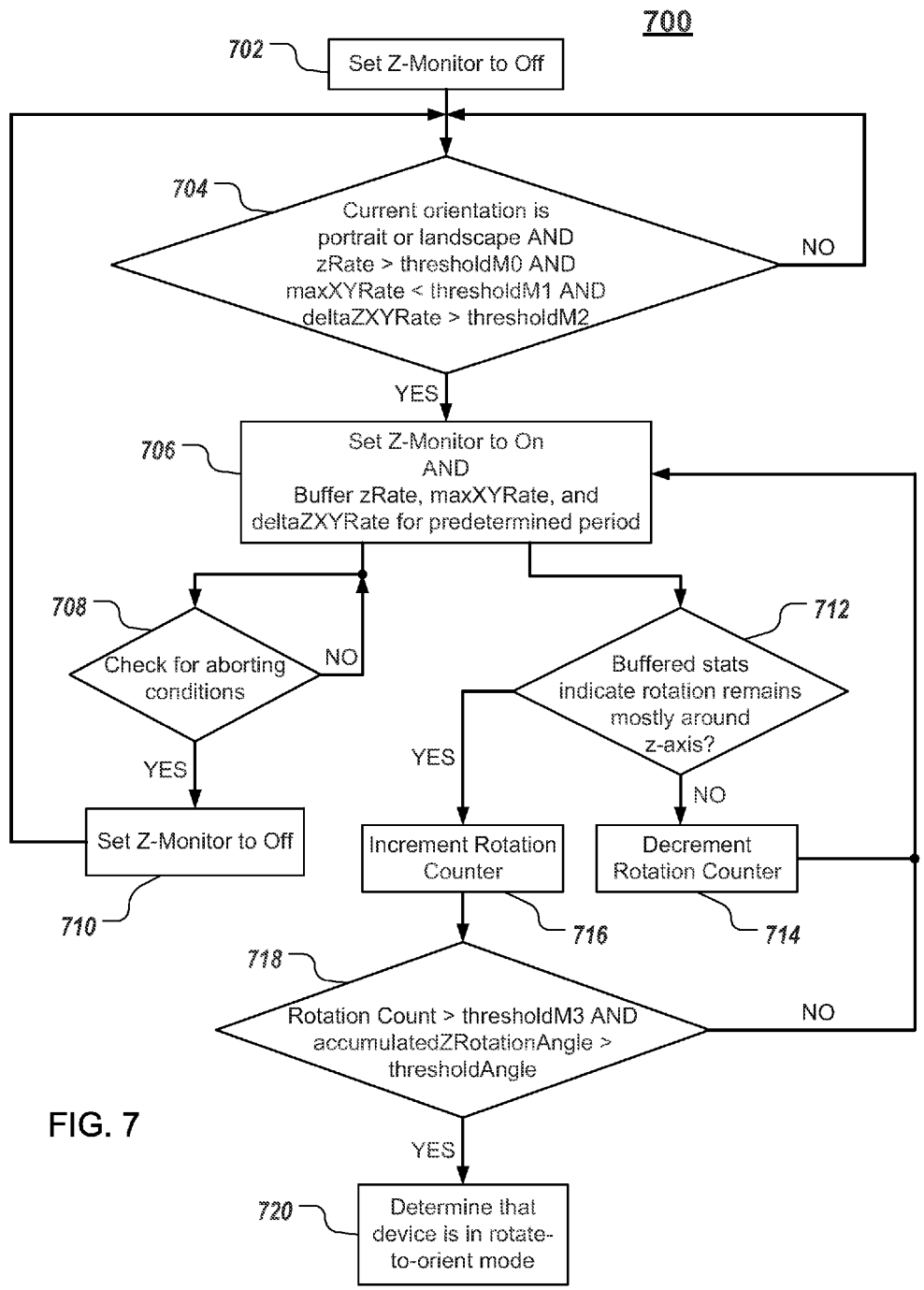
FIG. 7 is a flow diagram of an example process for determining the activation of a rotate-to-orient user mode.

FIG. 7 is a flow diagram of an example process 700 for determining the activation of a rotate-to-orient user mode. The rotate-to-orient user mode detects whether a user is rotating the mobile device in order to reorient the information being displayed on the mobile device. In general, a user holding the mobile device in the portrait orientation (as shown, for example, in state 108 of FIG. 1) may rotate the mobile device ninety degrees about the z-axis such that the mobile device is oriented in a landscape orientation (as shown, for example, in state 110 of FIG. 1). Similarly, a user holding the mobile device in the landscape orientation may rotate the mobile device ninety degrees about the z-axis such that the mobile device is oriented in a portrait orientation.

This reorientation of the mobile device from the portrait orientation to the landscape orientation may reorient the manner in which information is displayed on the mobile device. For example, when the mobile device is running a web browser and displaying a webpage, the webpage may be difficult for a user to view when the mobile device is displaying the webpage in the portrait orientation. Therefore, the user may reorient the mobile device into the landscape orientation to enable a better view of the webpage.

Process 700 is an example of a process that may be employed by the mobile device to determine whether a rotate-to-orient mode should be set. If the rotate-to-orient mode is set, the mobile device may take the setting of the rotate-to-orient mode into account by, for example, altering the processes 300, 400, 500, and/or 600, described above. For example, if the rotate-to-orient mode is set, the mobile device may alter the thresholds used in processes 300 and/or 400. Additionally or alternatively, the mobile device may, for example, alter the weights used in process 600.

Initially, a monitoring indicator (z-monitor) is set to off (702). The monitoring indicator indicates whether the mobile device should begin more detailed monitoring for the rotate-to-orient-mode. Specifically, the mobile device determines whether a threshold set of criteria are met (704). In one implementation, the mobile device determines whether: (1) the current detected orientation of the mobile device is portrait or landscape; (2) the current rate of rotation about the z-axis (zRate) detected by the gyroscope is greater than a thresholdM0; (3) the greater of the current rate of rotation about the x-axis and the current rate of rotation about the y-axis (maxXYRate) is less than a thresholdM1; and (4) the difference between the zRate and the maxXYRate (deltaZXYRate) is greater than a thresholdM2.

If the criteria are not met, the mobile device continues to determine whether the threshold set of criteria are met. If, however, each of the criteria is met, the monitoring indicator is set to on and the mobile device begins detailed monitoring for the rotate-to-orient mode by buffering sensor data (e.g., zRate, maxXYRate, and deltaZXYRate) for a predetermined period (706).

Once the detailed monitoring for the rotate-to-orient mode begins, two processes begin in parallel. In a first process, the mobile device determines whether any conditions arise that would abort the detailed monitoring (708). Aborting conditions may include any indications that the mobile is not being rotated to reorient the information being displayed. For example, the mobile device may determine whether the current orientation of the mobile device has changed to face up or face down, whether there is a sudden reversal in the direction of the current rate of rotation about the z-axis, or whether the current rate of rotation about the z-axis falls below a threshold. If no aborting conditions are met, the mobile device continues to check for aborting conditions until the detailed monitoring otherwise concludes. If, however, an aborting condition is met, the mobile device sets the monitoring indicator to off and returns to determining whether the threshold set of criteria are met (702).

In a second process of the detailed monitoring, the mobile device determines whether the sensor data stored in the buffer (e.g., the zRate, maxXYRate, and deltaZXYRate) over the predetermined period indicate that the rotation of the mobile device remains mostly around the z-axis (712). For example, in one implementation, the mobile device may determine whether: (1) the variance in the maxXYRate over the predetermined period is below a threshold; (2) the arithmetic mean of the deltaZXYRate collected over the predetermined period is greater than a threshold; and (3) the arithmetic mean of the zRate collected over the predetermined period is greater than a threshold. If the sensor data stored in the buffer indicates that the rotation of the mobile device does not remain mostly around the z-axis, the mobile device decrements a rotation counter and returns to operation 706.

If, however, the sensor data stored in the buffer indicates that the rotation of the mobile device remains mostly around the z-axis, the mobile device increments the rotation counter (716). The mobile device then determines whether the rotation counter exceeds a theresholdM3 and the total rotation of the mobile device around the z-axis since the detailed monitoring began exceeds a threshold angle (718). If both conditions are met, the mobile device enters the rotate-to-orient mode (720). Otherwise, the mobile device returns to operation 706.

Once rotate-to-orient mode has been entered, the mobile device may alter one or more of processes 300, 400, 500, and 600. In one implementation, for example, when the mobile device enters rotate-to-orient mode, the mobile device may set the gravity vector to the current output of the accelerometer, even when the device is determined to be in the dynamic state. Moreover, the mobile device may decrease the weights used in process 600 so that the mobile device more responsively updates the detected orientation.

Figure 8:
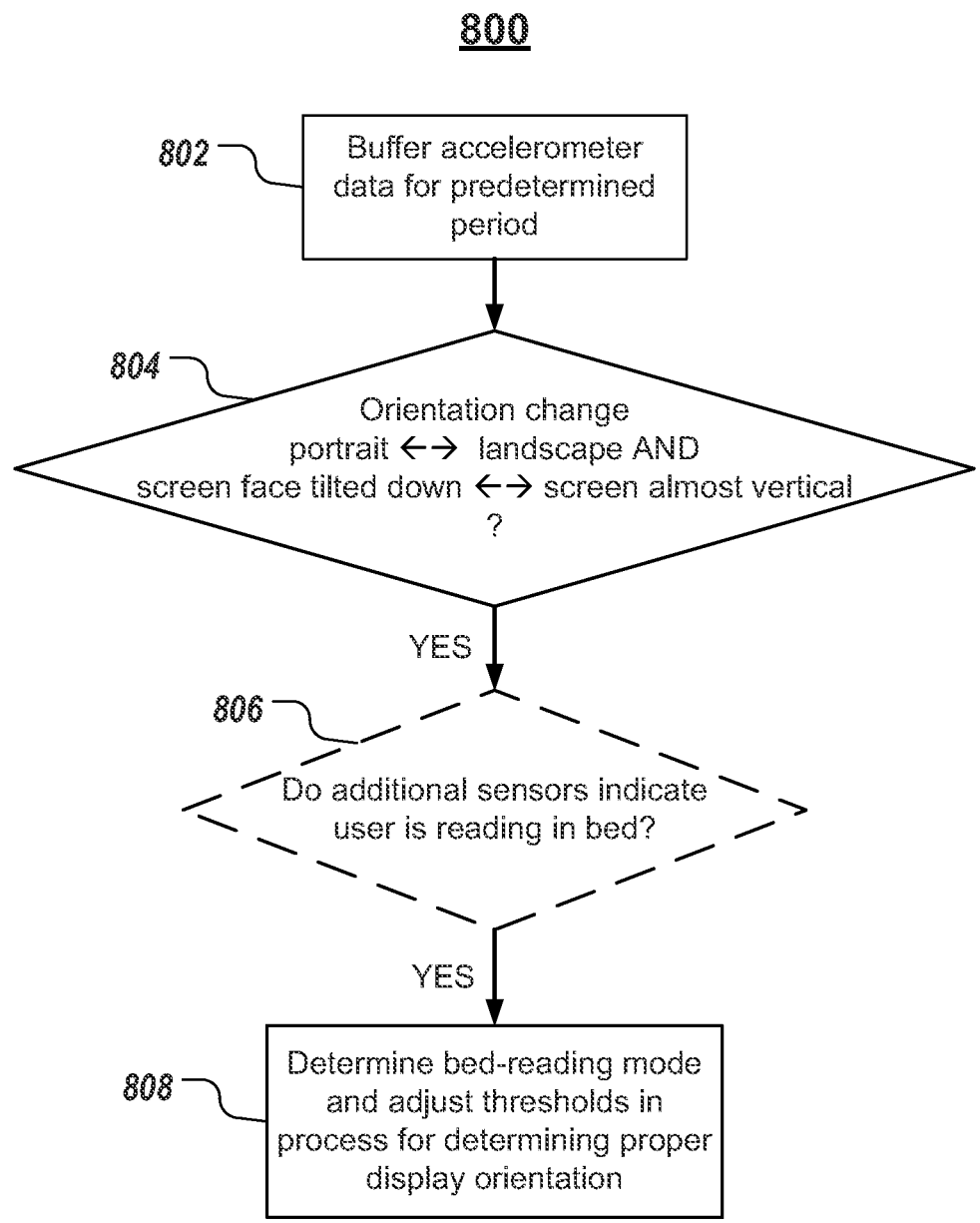
FIG. 8 is a flow diagram of an example process for determining the activation of a bed-reading user mode.

FIG. 8 is a flow diagram of an example process 800 for determining the activation of a bed-reading user mode. The bed-reading mode indicates whether a user of the mobile device is viewing information displayed by the mobile device while lying in bed. When a user is viewing information displayed by the mobile device while lying in bed, the user generally will either lie on his/her back or lie on his/her side. As a user transitions from one of these positions to the other, the user's perspective relative to the mobile device remains mostly unchanged, but the sensor data may indicate a change in the orientation of the mobile device.

For example, the user may lie on his/her back and hold the mobile device in the portrait orientation. If the user rolls onto his/her side, the sensor data may appear to indicate that the mobile device is now held in the landscape orientation, even though the device is still in the portrait orientation relative to the perspective of the user. Thus, when the mobile device detects that a user may be reading information displayed by the mobile device in bed, the mobile device may prevent a change in the orientation of the information displayed by the mobile device.

To determine whether the mobile device has entered a bed-reading mode, the mobile device receives and stores motion sensor data for a predetermined period of time (802). In some implementations, the predetermined period of time is determined based on the approximate amount of time it would take a user to change positions in bed (e.g., approximately three to four seconds). In some implementations, the motion sensor data may include data received from an accelerometer. However, the mobile device may use other motion sensor data as part of process 800. For example, the mobile device may use gyroscope data or light sensor data, as will be described with regard to operation 806.

The mobile device determines whether, during the predetermined period: (1) the mobile device transitioned between portrait orientation to landscape orientation and (2) the absolute value of the accelerometer data along the positive z-axis of the mobile device transitioned between being greater than a thresholdB0 (screen face tilted down) and being less than a thresholdB1 (screen almost vertical) (804). If both conditions are met, there is a high probability that a user has transitioned between lying on his/her back while holding the mobile device and lying on his/her side. In one implementation, the thresholdB1 may be set at or near zero, which indicates that the display surface of the mobile device is approximately vertical with respect to gravity.

In order to increase confidence in the determination of whether the bed-reading has been entered, the mobile device may optionally analyze additional sensor data from other sensors (806). In some implementations, for example, the mobile device may receive data from an ambient light sensor or camera to determine whether there are low light levels, which may indicate that the mobile device is in a darkened bedroom. Additionally or alternatively, the mobile device may determine the type of information being displayed by the mobile device or the type of application displaying the information. For example, the mobile device may determine that an e-reader application is displaying text from a book. Additionally or alternatively, the mobile device may receive data from a gyroscope. For example, the mobile device may determine whether the received gyroscope data indicates rotation of the mobile device around the z-axis, which may increase confidence in the determination that the bed-reading has been entered.

If the mobile device detects that the conditions of operations 804 and 806 are met, the mobile device enters the bed-reading mode (808). Once bed-reading mode has been entered, the mobile device may alter one or more of processes 300, 400, 500, and 600. In one implementation, for example, when the mobile device enters bed-reading mode, the mobile device the mobile device may increase the weights used in process 600 so that the mobile device only determines a change in orientation when the mobile device is almost completely vertical or completely horizontal with respect to gravity.

In some implementations, processes 700 and 800 may run continuously in parallel with processes 200, 300, 400, and 600. Thus, processes 200, 300, 400, and 600 continue to operate as described above until one or more of processes 700 and 800 determine that the mobile device has entered a special user mode. Though the special user modes have been described with regard to processes 700 and 800 as depending on motion sensor data, the detection of special user modes may also depend on input from a user (e.g., the user selects a special user mode) or output from one or more applications running on the mobile device.

Figure 9:
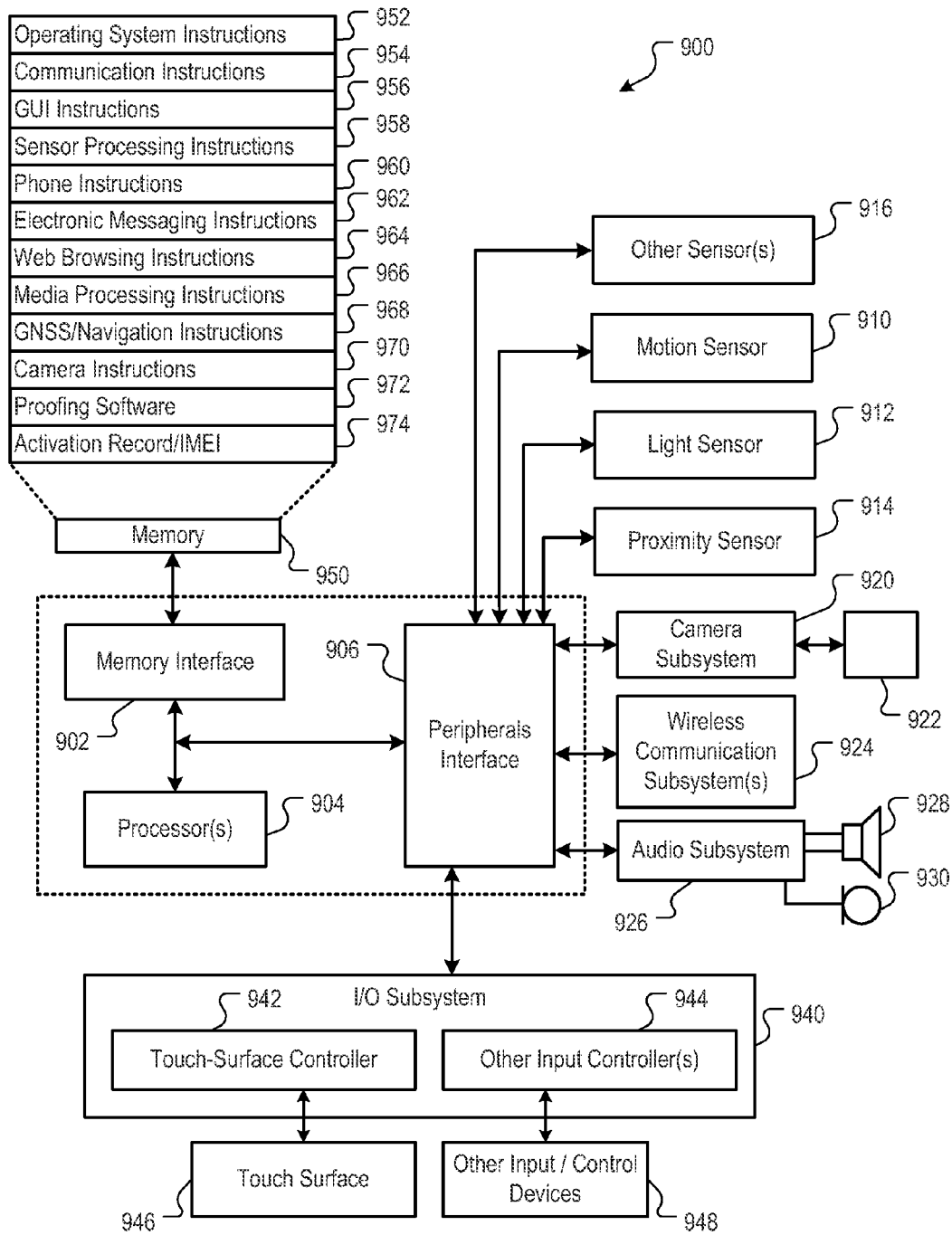
FIG. 9 is a block diagram of an exemplary system architecture implementing the features and processes of FIGS. 1-6.

FIG. 9 is a block diagram of an example computing device 900 that can implement the features and processes of FIGS. 1-6. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, one or more motion sensors 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, or other sensing device, to facilitate related functionalities. For example, the motion sensor 910 may include one or more of an accelerometer and a gyroscope. The motion sensors 910 may be sued to implement the methods and functions described above with respect to FIGS. 1-6.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voice-printing and voice authentication.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions, including instructions for implementing the features and processes described in reference to FIGS. 1-6; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store other software instructions 972 to facilitate other processes and functions, such as the device orientation processes and functions as described with reference to FIGS. 1-6. For example, the software instructions can include instructions for performing voice authentication on a per application or per feature basis and for allowing a user to configure authentication requirements of each application or feature available on device 100.

The memory 950 can also store other software instructions (not shown), such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) 974 or similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

What is claimed is:

1. A method comprising:
    receiving data from two or more motion sensors of a mobile device;
    calculating, after a period of time, statistical measurements of the motion sensor data, the statistical measurements including a standard deviation of the motion sensor data and an arithmetic mean of the motion sensor data, a first calculated statistical measurement of the statistical measurements based on data received from a first one of the two or more motion sensors, and a second calculated statistical measurement of the statistical measurements based on data received from a second one of the two or more motion sensors;
    comparing the first calculated statistical measurement to a first set of one or more threshold values;
    comparing the second calculated statistical measurement to a second set of one or more threshold values;
    based on the comparing, determining a dynamic state of the mobile device;
    based on the determined dynamic state, determining an orientation of the mobile device; and displaying information on the mobile device based on the determined orientation of the mobile device.

2. The method of claim 1, wherein determining the dynamic state of the mobile device includes:
   determining that the mobile device is in a first dynamic state when the calculated statistical measurement is less than a first threshold;
   determining that the mobile device is in a second dynamic state when the calculated statistical measurement is greater than or equal to the first threshold and less than a second threshold; and
   determining that the mobile device is in a third dynamic state when the calculated statistical measurement is greater than or equal to a third threshold.

3. The method of claim 2, wherein determining the orientation of the mobile device includes:
   analyzing the motion sensor data to determine the orientation of the mobile device according to a first process when the dynamic state is determined to be the first dynamic state; and
   analyzing the motion sensor data to determine the orientation of the mobile device according to a second process when the dynamic state is determined to be the second dynamic state.

4. The method of claim 2, wherein the determining the orientation of the mobile device further includes maintaining a previous orientation of the displayed information when the dynamic state is determined to be the third dynamic state.

5. The method of claim 1, comprising receiving data from one or more light sensors of the mobile device, wherein the orientation of the mobile device is determined based in part on the data received from the one or more light sensors.

6. A method comprising:
   receiving data from an accelerometer and data from a gyroscope of a mobile device;
   after a period of time, calculating a first statistical measurement of the received accelerometer data and calculating a second statistical measurement of the received gyroscope data;
   comparing the calculated first statistical measurement to a first set of one or more threshold values and comparing the calculated second statistical measurement to a second set of one or more threshold values;
   based on the comparing, determining a dynamic state of the mobile device;
   based on the determined dynamic state, determining an orientation of the mobile device; and
   displaying information on the mobile device based on the determined orientation of the mobile device.

7. A system comprising:
   a mobile device comprising a processor and memory, the mobile device configured to:
   receive data from two or more motion sensors of a mobile device;
   calculate, after a period of time, statistical measurements of the motion sensor data, the statistical measurements including a standard deviation of the motion sensor data and an arithmetic mean of the motion sensor data, a first calculated statistical measurement of the statistical measurements based on data received from a first one of the two or more motion sensors, and a second calculated statistical measurement of the statistical measurements based on data received from a second one of the two or more motion sensors;
   compare the first calculated statistical measurement to a first set of one or more threshold values;
   compare the second calculated statistical measurement to a second set of one or more threshold values;
   based on the comparing, determine a dynamic state of the mobile device;
   based on the determined dynamic state, determine an orientation of the mobile device and;
   displaying information on the mobile device based on the determined orientation of the mobile device.

8. The system of claim 7, wherein the mobile device is configured to determine the dynamic state of the mobile device by:
   determining that the mobile device is in a first dynamic state when the calculated statistical measurement is less than a first threshold;
   determining that the mobile device is in a second dynamic state when the calculated statistical measurement is greater than or equal to the first threshold and less than a second threshold; and
   determining that the mobile device is in a third dynamic state when the calculated statistical measurement is greater than or equal to a third threshold.

9. The system of claim 8, wherein the mobile device is configured to determine the orientation of the mobile device by:
   analyzing the motion sensor data to determine the orientation of the mobile device according to a first process when the dynamic state is determined to be the first dynamic state; and
   analyzing the motion sensor data to determine the orientation of the mobile device according to a second process when the dynamic state is determined to be the second dynamic state.

10. The system of claim 8, wherein the mobile device is configured to determine the orientation of the mobile device by maintaining a previous orientation of the displayed information when the dynamic state is determined to be the third dynamic state.

11. The system of claim 7, wherein the mobile device is configured to receive data from one or more light sensors of the mobile device, wherein the orientation of the mobile device is determined based in part on the data received from the one or more light sensors.

12. A system comprising:
   a mobile device comprising a processor and memory, the mobile device configured to:
   receive data from an accelerometer and data from a gyroscope;
   calculate a first statistical measurement of the received accelerometer data and a second statistical measurement of the received gyroscope data;
   compare the calculated first statistical measurement to a first set of one or more threshold values and the calculated second statistical measurement to a second set of one or more threshold values;
   based on the comparing, determine a dynamic state of the mobile device;
   based on the determined dynamic state, determine an orientation of the mobile device and;
   displaying information on the mobile device based on the determined orientation of the mobile device.

13. A non-transitory computer readable storage device storing a computer program product configured to cause a mobile device to perform operations comprising:
   receiving data from two or more motion sensors of a mobile device;
   calculating, after a period of time, statistical measurements of the motion sensor data, the statistical measurements including a standard deviation of the motion sensor data and an arithmetic mean of the motion sensor data, a first calculated statistical measurement of the statistical measurements based on data received from a first one of the two or more motion sensors, and a second calculated statistical measurement of the statistical measurements based on data received from a second one of the two or more motion sensors;

comparing the first calculated statistical measurement to a first set of one or more threshold values;

comparing the second calculated statistical measurement to a second set of one or more threshold values;

based on the comparing, determining a dynamic state of the mobile device;

based on the determined dynamic state, determining an orientation of the mobile device and;

displaying information on the mobile device based on the determined orientation of the mobile device.

14. The computer-readable storage device of claim 13, wherein determining the dynamic state of the mobile device includes:

determining that the mobile device is in a first dynamic state when the calculated statistical measurement is less than a first threshold;

determining that the mobile device is in a second dynamic state when the calculated statistical measurement is greater than or equal to the first threshold and less than a second threshold; and determining that the mobile device is in a third dynamic state when the calculated statistical measurement is greater than or equal to a third threshold.

15. The computer-readable storage device of claim 14, wherein determining the orientation of the mobile device includes:

analyzing the motion sensor data to determine the orientation of the mobile device according to a first process when the dynamic state is determined to be the first dynamic state; and analyzing the motion sensor data to determine the orientation of the mobile device according to a second process when the dynamic state is determined to be the second dynamic state.

16. The computer-readable storage device of claim 14, wherein the determining the orientation of the mobile device further includes maintaining a previous orientation of the displayed information when the dynamic state is determined to be the third dynamic state.

17. The computer-readable storage device of claim 13, the operations comprising receiving data from one or more light sensors of the mobile device, wherein the orientation of the mobile device is determined based in part on the data received from the one or more light sensors.

18. A non-transitory computer readable storage device storing a computer program product configured to cause a mobile device to perform operations comprising:

receiving data from an accelerometer and data from a gyroscope of a mobile device;

after a period of time, calculating a first statistical measurement of the received accelerometer data and calculating a second statistical measurement of the received gyroscope data;

comparing the calculated first statistical measurement to a first set of one or more threshold values and comparing the calculated second statistical measurement to a second set of one or more threshold values;

based on the comparing, determining a dynamic state of the mobile device;

based on the determined dynamic state, determining an orientation of the mobile device and;

displaying information on the mobile device based on the determined orientation of the mobile device.

\* \* \* \* \*